United States Patent [19]

Maher

[11] 4,027,209
[45] May 31, 1977

[54] CERAMIC CAPACITOR HAVING A SILVER DOPED DIELECTRIC OF $(PB,LA)(ZR,TI)O_3$ AND GLASS

[75] Inventor: Galeb H. Maher, North Adams, Mass.

[73] Assignee: Sprague Electric Company, North Adams, Mass.

[22] Filed: Oct. 2, 1975

[21] Appl. No.: 619,089

[52] U.S. Cl. .............................. 361/361; 252/63.2; 29/25.42
[51] Int. Cl.$^2$ ......................................... H01G 4/12
[58] Field of Search ................. 317/258; 29/25.42; 252/63.2; 106/73.3, 46 A

[56] References Cited

UNITED STATES PATENTS

| | | | |
|---|---|---|---|
| 2,758,267 | 8/1956 | Short | 317/258 X |
| 3,223,905 | 12/1965 | Fabricius | 317/258 |
| 3,316,184 | 5/1967 | Nagase | 252/63.2 |
| 3,760,244 | 9/1973 | McClelland | 317/258 |

OTHER PUBLICATIONS

Rusinko, "Dielectric Mixing in the PLZT-$Pb_5Ge_3O_{11}$ System", Thesis, Penn State College of Earth & Mineral Sciences, 5/75.

Schulze et al., "Dielectric Aging in the PLZT System", In Ferroelectronics, 9/75, vol. 9, pp. 203,207.
Taylor, "Electrical Properties of Niobium Doped Ferroelectric Pb (Zr Sn $T_1$)$O_3$ Ceramics", in J. of Applied Physics, vol. 18, No. 12, 11/67, pp. 4697–4706.

*Primary Examiner*—E. A. Goldberg
*Attorney, Agent, or Firm*—Connolly and Hutz

[57] ABSTRACT

The dielectric material of a ceramic capacitor contains a high temperature silver doped ceramic with a small proportion of a low temperature glass. The ceramic component consists essentially of a lead zirconate in which from 0.07 to 0.16 molar parts of the lead are replaced by lanthanum and in which from 0.10 to 0.40 molar parts of the zirconate are replaced by titanate. The capacitors may be fired in an air atmosphere without substantial loss of lead at temperatures as high as 2000° F. Silver containing electrodes may be employed in a monolithic capacitor of this invention, the co-fired electrode advantageously causing a silver doping of the ceramic that in turn improves the stability of capacitance with temperature and applied voltage. Alternatively, the ceramic may be predoped with silver to achieve this result.

26 Claims, 3 Drawing Figures

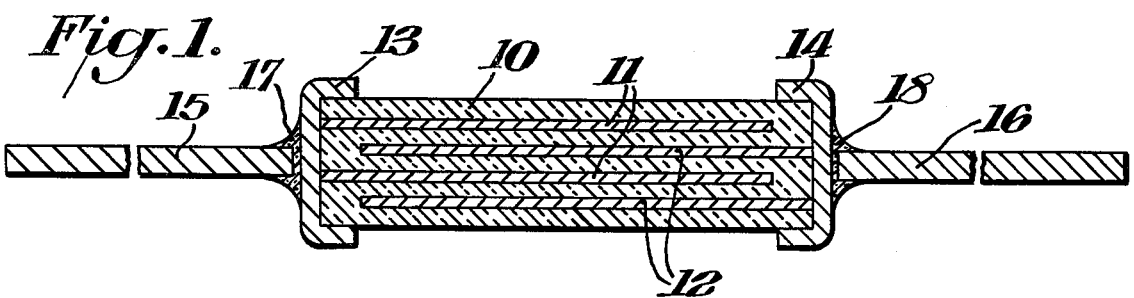
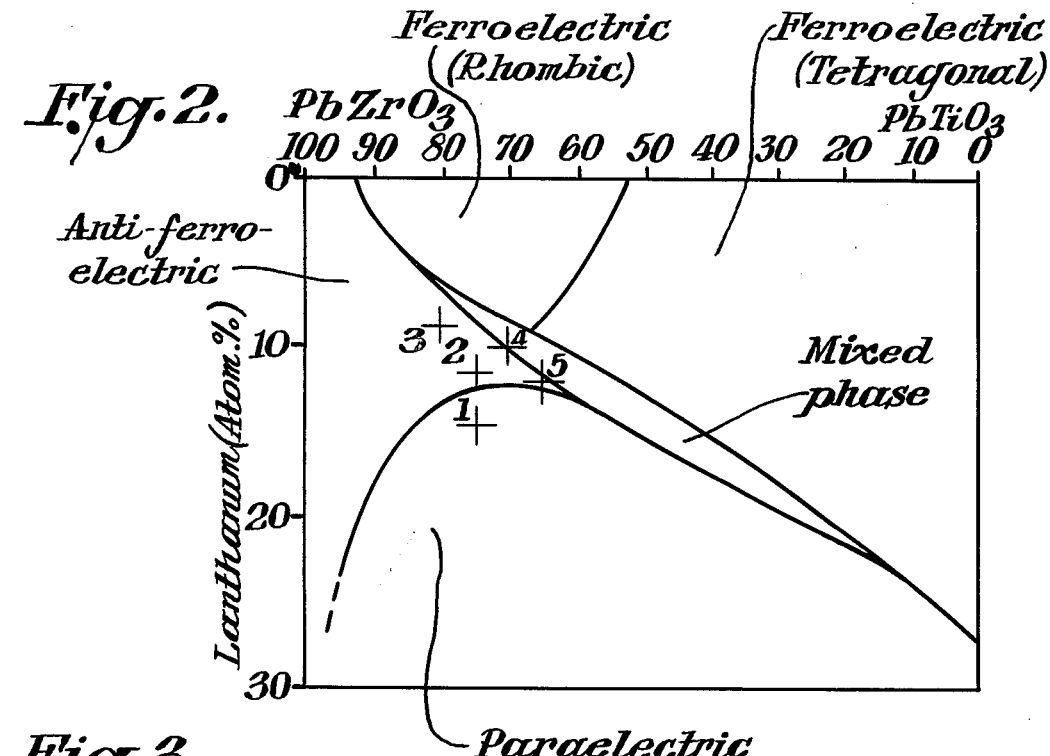
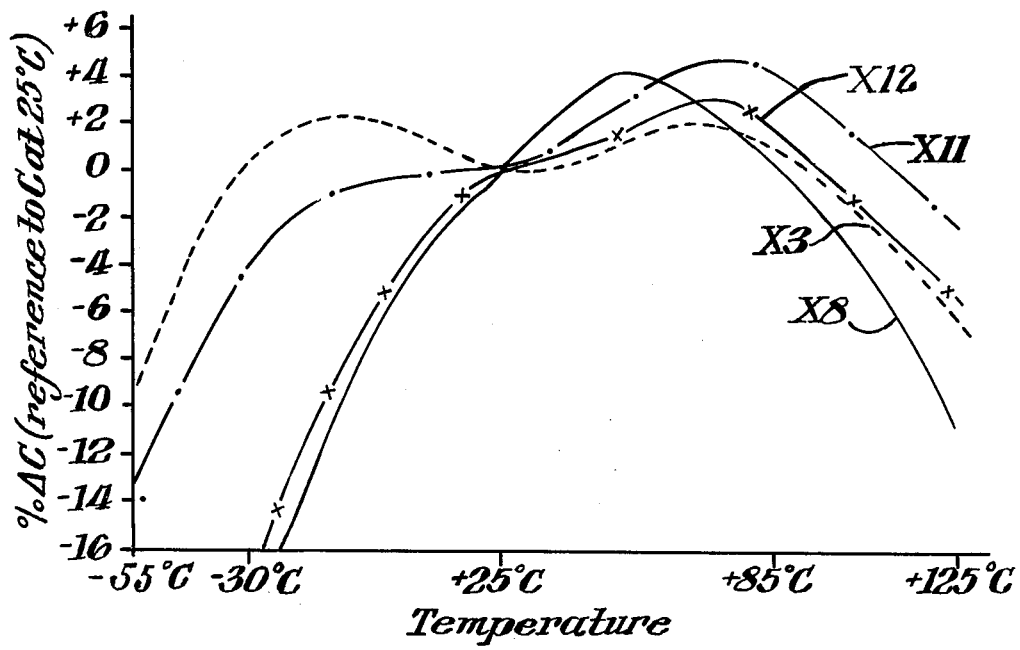

CERAMIC CAPACITOR HAVING A SILVER DOPED DIELECTRIC OF (PB,LA)(ZR,TI)O₃ AND GLASS

BACKGROUND OF THE INVENTION

This invention relates to ceramic capacitors having a medium temperature firing dielectric of lead-lanthanum zirconate-titanate and glass, and more particularly to such capacitors wherein the ceramic is doped and reacted with silver. The term doped as used herein is intended to mean reacted and not simply mixed with.

Glass containing ceramic dielectric materials are known as being capable of densification at medium firing temperatures, whereas ceramics without glass generally require a firing temperature of greater than 2200° and often at least 2450° F.

Lead-zirconate-titanate ceramics have been employed for many years as electromechanical transducers and more recently lead-lanthanum zirconate-titanates have found use in electro-optic transducers. For these purposes, the ceramic is formulated so as to form a ferroelectric body, which formulations are unsuitable for making electrical capacitors that must exhibit a relatively stable dielectric constant as a function of the applied electric field. Furthermore, these bodies tend to undergo a substantial out diffusion of lead at firing which must be so compensated that the proper composition after firing to maturity is assured. The potential loss of the poisonous lead to the atmosphere is a hazard to the human operators, is a corrupting influence in the manufacturing equipment and is a source of much difficulty in maintaining a uniform composition of the fired bodies.

It is often desirable to have a capacitor that exhibits a low temperature coefficient of capacitance (TCC), a low voltage coefficient of capacitance (VCC) and a high insulation resistance. It is further desirable that the dielectric material have a high dielectric constant to minimize the required size of the capacitor of a given capacity value.

It is therefore an object of this invention to provide an improved ceramic capacitor that exhibits a low VCC, a low TCC, and a high insulation resistance.

It is a further object of this invention to provide a ceramic capacitor dielectric material that is capable of being fired at temperatures below 2000° F and that exhibits a low VCC and dielectric constant greater than 300.

It is a further object of this invention to provide a low cost monolithic capacitor suitable for use at high a.c. and d.c. voltages.

It is another object of this invention to provide a lead-lanthanum zirconate-titanate dielectric body by a method wherein only small amounts of lead are lost at firing and having predictable performance characteristics.

It is yet another object of this invention to provide a lead-lanthanum zirconate-titanate dielectric material that does not require special firing atmospheres.

SUMMARY OF THE INVENTION

A ceramic capacitor is comprised of at least two spaced electrodes in contact with and separated by a silver doped dielectric material. The dielectric material consists of a major proportion of a calcined high firing temperature ceramic and a minor proportion of a low melting temperature glass. The high temperature ceramic consists essentially of a lead zirconate in which from 0.07 to 0.16 molar parts of the lead are replaced by lanthanum and in which from 0.10 to 0.40 molar parts of the zirconate are replaced by titanate. The low temperature glass may advantageously include lead oxide in an amount not less than 20 weight percent which is especially effective in preventing out diffusion of lead from the ceramic.

The dielectric materials of this invention will densify at firing temperatures less than 2000° F and monolithic capacitors made therefrom may advantageously include palladium-silver electrodes whereas these ceramic materials minus the glass require firing temperatures in excess of 2200° F for densification. The low temperature glass should have a melting temperature of less than 1600° F and preferably less than 1400° F, and no less than 4.5 weight percent of such glass is required in the dielectric material. A wide variety of low temperature glasses are suitable such as borate, lead borosilicate, bismuth borosilicate, bismuth alumina silicate, lead alumina borate, and lead bismuth boroalumina silicate. Small additions of alkali-earth or -metal oxides may also be included. More specifically, a range of suitable glass compositions is defined by the following components given in weight percent, from 8 to 30% of the glass formers selected from $B_2O_3$, $SiO_2$ and $GeO_2$; from 0 to 3% $Al_2O_3$; from 0 to 11% ZnO; from 0 to 50% CdO; from 0 to 90% $Bi_2O_3$ and from 0 to 85% PbO.

The degree to which the presence of small quantities of glass in this dielectric material prevents the out diffusion of lead at firing is quite surprising. The moderately low firing temperatures of the glass containing dielectric bodies of this invention results in a much smaller loss of the volatile lead component during firing. Furthermore the glass phase of the glass ceramic dielectric of this invention tends to seal in and reduce the out diffusion of the lead from the ceramic grains. In a similar manner, in a monolithic capacitor of this invention the active dielectric between adjacent buried electrodes is covered within a layer of the glass ceramic material further retarding the out diffusion of lead from the active portions of the dielectric. In addition, when lead containing glass is employed in the dielectric material of this invention, it advantageously serves to replenish the lead that is lost from the ceramic during firing. For these reasons the material may be fired in air without special atmospheres and without substantial loss of lead from the ceramic grains.

Although the dielectric properties of the glass ceramic material in monolithic capacitors made according to the principles of this invention are generally superior to those of disc type capacitors, such novel disc capacitors provide new and useful properties and are included within the scope of this invention.

In a monolithic type capacitor of this invention the use of at least one buried silver-containing electrode results in a reaction between the electrode and the dielectric at firing wherein silver diffuses into and reacts with the lead titanate zirconate lattice, providing a further improvement in electrical performance. The nature of this improvement, such as lower DF and increased Curie temperature, suggests that the effect of the silver dopant in the dielectric is somewhat the same as if a further reduction in the out diffusion of lead therefrom at firing had been effected. An additional and more pronounced benefit is the stabilizing of the TCC at low temperatures. Thus it is possible, especially in a disc type capacitor with later fired electrodes, to make substantial improvements in the capacitor performance characteristics by including silver in the ceramic formulation itself prior to mixing with glass and firing.

Capacitors that have been produced according to the principles of this invention exhibit low stable VCC and TCC characteristics and the dielectric constant (K) of the dielectric material therein is high compared to unmodified lead zirconate, many such modified materials having a K greater than 1000. In addition, the characteristic insulation resistance advantageously tends to be very high. Thus capacitors of this invention are well suited for use in high a.c. and/or d.c. voltage service.

BRIEF DESCRIPTION OF THE DRAWING

FIG. 1 shows in cross-section a monolithic ceramic capacitor of this invention.

FIG. 2 shows a phase diagram for lead-lanthanum zirconate-titanate ceramic compositions.

FIG. 3 shows a graph of capacity as a function of temperature for several capacitors of this invention.

DESCRIPTION OF THE PREFERRED EMBODIMENTS

Monolithic capacitors being designated here as hand screened (HM) were made in the laboratory and each comprises a single pair of electrodes buried in the dielectric material. Other monolithic capacitors were produced on standard manufacturing equipment by well known methods of producing such monolithic capacitor products, being identified here by the letter M. Disc capacitors were made in the laboratory to preliminarily evaluate the relative characteristics of various compositions of dielectric material, and are designated here by the letter D. A brief description of the methods and steps that were employed for the examples is as follows.

For making the glass, approximately 600 grams of the constituent oxides as shown in Table I below for four glass compositions were melted in a platinum crucible between 1200° and 1600° F for one hour and then water quenched. The resulting material was then jet pulverized to about 1 to 3 microns average particle diameter.

Table I

| | Glass Compositions (in weight percent) | | | |
|---|---|---|---|---|
| | B1 | B2 | B3 | B4 |
| $B_2O_3$ | 13.1 | 5.0 | 5.3 | 0 |
| $SiO_2$ | 12.3 | 5.0 | 4.4 | 0 |
| $Al_2O_3$ | 2.5 | 1.0 | 1.0 | 0 |
| ZnO | 10.0 | 5.0 | 2.3 | 0 |
| CdO | 0 | 36.0 | 0 | 0 |
| $Bi_2O_3$ | 0 | 23.0 | 87.0 | 0 |
| PbO | 62.1 | 25.0 | 0 | 81.3 |
| $GeO_2$ | 0 | 0 | 0 | 18.7 |

For making the (Pb,La) (Zr,Ti)$O_3$ ceramic, the oxides of Pb, Zr and Ti and lanthanum carbonate were weighted out in the desired molar proportions according to the formula below and the composition ratios of Table II to yield about a 30 pounds mixture.

$$Pb_{1-x}La_x(Zr_yTi_{1-y})_{1-x/4}$$

The mixture was ball milled in deionized water, oven dried at 250° C, granulated and then calcined twice at 1650° F in a closed alumina sagger soaking for 1 hour at this temperature. This material was then sintered for 1½ hours at 2250° F in a closed crucible. This blend was then crushed and jet pulverized to an average particle size of about 1.2 microns, as determined by a standard Fisher Subsieve analyzer. The above formula is more accurately a recipe having been taught to be lead rich and having been preferred for preparing the starting materials by those who have employed such ceramics in electro-optical transducer devices. In the ceramic composition designated A1 in Table II for example, $x$ is 0.14 and $y$ is 0.75. A standard phase diagram is shown in FIG. 2 wherein five distinct phases are located and identified, and the phase diagram is provided here merely as a reference. Five points are shown on the phase diagram of FIG. 2, identified by crosses 1 through 5 that correspond to the five experimental ceramic compositions of Table II, A1 through A5, respectively.

Table II

| | Ceramic Compositions (in mole percent) | | | | |
|---|---|---|---|---|---|
| | A1 | A2 | A3 | A4 | A5 |
| Pb/La | 86/14 | 88.8/11.2 | 91/9 | 90/10 | 88/12 |
| Zr/Ti | 75/25 | 75/25 | 80/20 | 70/30 | 65/35 |

A mixture of the glass and the ceramic powders in the specific weight ratios indicated in Table III was stirred with an organic binder medium of essentially turpentine, 6% pine oil and 5% lecithin. This dispersion or slurry contained about 70% by weight of ceramic and glass. The blend was milled for about 6 hours.

Each hand screened monolithic capacitor (HM) was constructed by repeatedly hand screening a layer of the dielectric slurry on a glass substrate and drying. Two film electrodes of a conducting paste were successively interleaved and buried within the layers of dielectric material so as to be spaced by about 0.0015 inches of a dielectric layer. The green body was then removed from the glass substrate and fired in air on an open slab for one hour at a peak firing temperature, which peak temperature is specifically noted for each example in Table III. The monolithic capacitors (M) for which the composition is given under example X9 in Table III were produced by applying successive coatings of the above noted glass ceramic mixture to a substrate, drying each layer in turn and screen printing an electroding paste of 70% silver and 30% palladium particles to the last dried layer of dielectric material. Before applying the next successive dielectric layer, the screened pattern of electroding paste was dried. The stack was then fired to maturity in air on an open slab. A silver paste was applied to opposite ends of the body at which edges of the buried electrodes were exposed and was fired at about 1400° F for 5 minutes. A lead wire was then soldered to or otherwise connected to each of the two silvered terminals. The capacitors represented by example X9 contain 16 electrodes and 15 active dielectric layers, each active layer being about 0.0015 inch in thickness. More generally, the thickness of the active layers in the monolithic capacitors of this invention is on the order of 0.001 inch.

Table III

| Example | Glass (% by weight) | | Ceramic | | Firing Temp. (°F) | Type Capacitor | Type Electrode |
|---|---|---|---|---|---|---|---|
| X1 | 6.4 | B1 | 93.6 | A1 | 1950 | HM | Ag/Pd |
| X2 | 7 | B2 | 93 | A2 | 1950 | HM | Ag/Pd |
| X3 | 7.8 | B3 | 92.2 | A2 | 1950 | HM | Ag/Pd |
| X4 | 7 | B2 | 93 | A3 | 1950 | D | ** |
| X5 | 7 | B2 | 93 | A2 | 1950 | D | ** |
| X6 | 7 | B2 | 93 | A4 | 1950 | D | ** |
| X7 | 7 | B2 | 93 | A5 | 1950 | D | ** |
| X8 | — | | 100 | A2 | 2200 | HM | Au/Pt |
| X9 | 7 | B2 | 93 | A2 | 1900 | M | Ag/Pd |
| X10 | 7.5 | B4 | 92.5 | A2 | 1950 | HM | Ag/Pd |
| X11 | 6 | B2 | 94 | A2 | 1900 | HM | Ag/Pd |
| X12 | 6 | B2 | 94 | A2 | 1900 | HM | Au/Pt |
| X13 | 2 | B2 | 98 | A2 | 2050 | HM | Ag/Pd |
| X14 | 2 | B2 | 98 | A2 | 2050 | HM | Au/Pt |
| X15 | 4 | B2 | 96 | A2 | 2050 | HN | Ag/Pd |
| X16 | 4 | B2 | 96 | A2 | 2050 | HM | Au/Pt |
| X17 | 6.5 | B2 | 93.5 +0.5* | A2 Ag | 1900 | HM | Ag/Pd |
| X18 | 6.5 | B2 | 93.5 +0.5* | A2 Ag | 1900 | HM | Au/Pt |

*weight percent of silver oxide
**external electrodes

A cross sectional view of a monolithic glass ceramic capacitor illustrating the structure of the experimental monolithic samples described herein, is shown in FIG. 1. The glass ceramic body 10 has buried therein electrode films 11 interleaved with electrode films 12. Conductive termination coatings 13 and 14 contact electrode sets 11 and 12, respectively. Lead wires 15 and 16 are attached by solder bonds 17 and 18 to terminations 13 and 14, respectively.

The disc capacitors were made by combining the pulverized ceramic and glass powder in de-ionized water and polyvinyl-alcohol binder solution and wet ball billing the mix. After drying and granulating, pellets of disc shape were formed by pressing the mix to about 60% of theoretical density. The pellets were baked at 400° C to remove the binder after which they were fired to maturity in air on an open slab, soaking for about 1½ hours at peak temperature. A silver paste was applied on the flat opposite surfaces of the mature pellets and was fired at 1450° F for ½ hour.

Performance data is provided in Table IV for the experimental samples. The VCC data is given at three applied fields in volts per mil, a mil being 0.001 inch. The K was measured at 1 KHz and 1 volt (r.m.s.) per mil.

inch) of active dielectric thickness and the glass ceramic body of this example exhibits a prominent antiferroelectric characteristic. The temperature coefficient of capacity (TCC) is almost within the widely employed standard tolerance limits of ± 15% over the range −55° to +125° C. The active dielectric material thickness was 0.0012 inch, and at 700 volts the stored energy was about 18 joules per cubic inch of active dielectric volume. The insulation resistance (IR) at 100 VDC and 150° C was initially 700 megohm-microfarads and after 100 hours under these same conditions become even higher. Other capacitors of the same structure were fired also in air but at 1850° F with the result that the performance characteristics, relative to the above mentioned parts fired at 1950° F, were not substantially different.

In the example X2 the performance is very similar to the results obtained for example X1. The IR was 8000 and 5000 megohm-microfarads at +125° C, respectively, representing a further improvement in the stability of the VCC characteristic. It is noted here that the negative slope of the VCC characteristic for these essentially antiferroelectric materials is relatively straight as a function of increasing voltage bias so that the range of voltage over which the capacity value remains stable Table IV

| Ex. | K at 25° C | DF % | VCC (%ΔC ref. 0 volts) | | | TCC (%ΔC ref. 25° C) | | | | Type Unit |
|---|---|---|---|---|---|---|---|---|---|---|
| | | | 20V/ mil | 50V/ mil | 100V/ mil | −55 °C | −30 °C | +85 °C | +125 °C | |
| X1 | 1000 | 0.4 | +2 | +3 | +0.5 | −12 | −3 | +7 | +1 | HM |
| X2 | 1075 | 0.5 | +3 | +6.5 | +3 | −14 | −4 | +4 | −3 | HM |
| X3 | 775 | 0.25 | +3.5 | +7 | +5 | −9 | 0 | +1 | −7 | HM |
| X4 | 1350 | 3.0 | +7.5 | +7.5 | +4 | −37 | −26 | +16 | +8 | D |
| X5 | 1150 | 2.4 | +5 | +3.5 | −4 | −35 | −25 | +7 | −6 | D |
| X6 | 2150 | 9.0 | +10 | +3 | −6 | −48 | −36 | +37 | +25 | D |
| X7 | 2050 | 9.8 | +8 | 0 | <−10 | −45 | −33 | +30 | +19 | D |
| X8 | 2250 | 1.85 | +4 | +5.5 | −1.5 | −35 | −20 | 0 | −13 | HM |
| X9 | 950 | 0.47 | +3 | +6 | +4 | −13 | −4 | +4 | −2 | M |
| X10 | 975 | 0.35 | +3 | +7 | +2 | −11 | −2 | +6 | +2 | HM |
| X11 | 1200 | 0.43 | +3.5 | +7 | +5.5 | −14 | −4 | +4 | −1 | HM |
| X12 | 1500 | 2.1 | +3.5 | +4 | −0.5 | −31 | −19 | +2 | −7 | HM |
| X15 | 1150 | 0.2 | | | | | | | | HM |
| X16 | 1700 | 1.5 | | | | | | | | HM |
| X17 | 1050 | 0.39 | +3 | +5.5 | +5 | −12 | −4 | +4 | −4 | HM |
| X18 | 1200 | 0.9 | +3.5 | +6 | −1 | −25 | −12 | +6 | −1 | HM |

It is seen that for example X1, the relative dielectric constant (K) is high, the voltage coefficient of capacity is relatively stable from 0 to 100 volts per mil (0.001 for any particular practical purpose can be roughly determined from the data presented in Table IV. Another group of these capacitors of X2 construction were fired to maturity at 1950° F in a closed crucible with zirconia and containing about 10% $PbZrO_3$-$PbTiO_3$ to provide a lead rich atmosphere. The performance characteristics of these capacitors was nearly the same as those reported for the open slab fired parts reported as X2 in Table IV.

The performance data for example X3 shows that excellent results are obtained except for a lower K even though no lead is included in the glass. The ratio of glass to ceramic by volume measure was the same for the dielectric formulations of examples X1 through X10. Thus the B3 glass without lead as in example X3 is seen to be less effective on a volume basis in preventing the out diffusion of lead from the ceramic. It is concluded that a lead containing glass such as B1 or B2 is preferred, such glass preferably having at least 20% PbO by weight therein.

In disc examples X4, X5, X6 and X7, listed in order of decreasing ratio of zirconate to titanate in the ceramic compositions, it is seen that the VCC characteristic is excellent for example X4 and becomes progressively poorer in the following three examples. With reference to FIG. 2, these examples X4 through X7 correspond to the points 3, 2, 4 and 5, respectively, which lie in the antiferroelectric region of the phase diagram. Although the dielectric material of example X7 is still antiferroelectric, it is concluded that a glass ceramic material wherein the ceramic component contains less than 60 mole percent of the zirconate would not be sufficiently antiferroelectric to be useful in a capacitor of this invention that is intended for high AC or DC voltage service.

In this regard it is noted that the phase diagram of FIG. 2 represents very pure materials of high uniformity. The glass ceramic dielectric materials of this invention are made by relatively low cost methods for producing capacitor dielectric grade bodies. The glass ceramic dielectric materials of this invention may be called a mixed system in the sense that the ceramic grains therein do not necessarily have a uniform composition from grain to grain and it is only necessary that most of the grains of the dielectric are antiferroelectric so as to impart to a capacitor made therefrom a relatively low and stable voltage coefficient of capacity. On the other hand, conventional lead zirconate-titanate materials for use as electro-mechanical transducers and especially as electro-optic devices are made by more rigorously controlled processes. For example, purer starting materials are employed, more thorough mixing is required, potentially corrupting organic binders are omitted, parts are hot pressed to achieve very high densities and uniform reactions at firing, and controlled atmospheres are employed to prevent the escape to the volatile lead at firing.

The capacitors of example X8 have a dielectric body of 100% ceramic composition A2, and are shown here to illustrate the relative improvements that are achieved by adding glass therein as in example X3. Although the K in example X8 is quite high, the DF is higher and the capacity as a function of temperature is less stable. Also, the Curie temperature for example X8 is about 55° C while that of example X3 is about 75° C as is seen in the TCC curves for these two capacitors in FIG. 3. It is thus believed that the capacitors of example X8 have lost a substantial amount of lead from the dielectric body at firing which is prevented by the presence of the glass in the dielectric of example X3 and additionally by a reaction between the silver bearing electrodes and the dielectric material as will be explained later herein. The results of other experiments support this theory, a positive correlation being observed between lead content in the ceramic and Curie temperature.

The performance results for the capacitors of example X9 are very similar in all respects to those of example X2 and demonstrate that the simple hand screened monolithic capacitors (HM) made in the laboratory provide a sound indication of results that will be obtained by mass production means for capacitors of this invention.

The hand screened monolithic (HM) capacitors of example X10 are similar in construction to those of example X2, having about the same volume percent of glass in the dielectric but including a different glass. The results are excellent although exhibiting a less stable VCC than for either capacitors of examples X1 and X2.

Examples X11 through X16 were prepared to determine the minimum quantity of glass that must be included in the glass ceramic to achieve the desired firing and performance characteristics. With only 2% by weight of the glass in the dielectric material, as in examples X13 and X14 it was not possible to obtain densification of the material even firing at temperatures as high as 2050° F. Thus no meaningful performance results were obtained. With 4% by weight glass, it was necessary to fire the capacitors of example X15 and X16 at 2050° F to obtain even a fairly dense body. The K is higher than in example X2, but the X15 and X16 body exhibited slight surface porosity and apparently a substantial loss of lead. This formulation is thus not suitable for inclusion of low cost silver containing electrodes for simultaneous firing with the dielectric body. With 6% by weight of glass included in the dielectric body as in examples X11 and X12, the body is dense and nonporous, as determined by a standard dye test, and the performance results are excellent in the case of example X11. It is concluded therefore that at least 4.5 weight percent glass is required in the dielectric material of this invention to achieve a low temperature firing body and a stable capacity as a function of voltage and temperature. As the proportion of glass increases it is seen that all of the performance parameters tend to improve except the K diminishes and it is estimated that for as much as 15% by weight of glass, the K would drop below 300.

The data from examples X11 through X14 also show another startling and unexpected result relating to the dependance of performance characteristics upon the type of electrode employed therein. Electron microprobe analysis of the dielectric material and of the electrodes from capacitors in examples X11 revealed the existence of about 0.7 weight percent silver in the dielectric and a loss of about 80% of the silver from the electrodes. In the multilayer capacitors of X9, however, the silver content in the dielectric was about the same while the silver loss from the electrode was between 25% to 30% of the original value. In the capacitors of example X12, which differ from those of example X11 by having platinum gold electrodes in place of palladium silver electrodes, the K is a little higher but the DF is also higher and the variations of capacitance with voltage and temperature is much greater. It is also seen in FIG. 3 that the Curie point of the material in example X11 is higher than that of example X12. The various monolithic capacitors having silver bearing electrodes, above described, contained silver in the dielectric which resulted in an improved performance. From the fact that they exhibited excellent life test results (e.g. in example X1, IR exceeds 700 megohm microfarads after 100 hours at 100 volts/mil and 150° C) it seems unlikely that the silver is contained in the free state in the dielectric material. Since silver has about the same ionic radius as lead (1.26A versus 1.20A), it is believed that the silver ions are diffusing into the crystal ceramic lattice and filling some of the vacant $Pb^{2+}$ sites and thus compensating for the loss of lead therein. It is further postulated that other dopant elements having about the same ionic radius, such as potassium, may have a similar beneficial effect.

In examples X17 and X18 the ceramic material included the addition of 0.5% by weight of silver oxide power in the above mentioned blend of ceramic oxides. Although in the capacitors of example X18, having platinum-gold electrodes, the silver in the dielectric compositions, about 0.45 weight percent as found in the fired body, was only about half enough to stabilize the TCC to the extent seen in example X11, the TCC and VCC are seen to be improved over that of capacitors in example X5 wherein the electrodes are applied to the disc only after firing. The lack of any silver in the dielectric material of the experimental disc capacitors explains to a large extent the discrepancies observed between the performance data of monolithic and disc capacitors (e.g. compare X2 and X5). Clearly the disc capacitors of this invention may advantageously contain a silver doped glass ceramic dielectric that is accomplished either by introducing the silver as silver oxide into the precursor oxides of the ceramic, or by simultaneously firing the body to maturity with silver containing electrodes having been applied thereto, or both. Alternatively, after blending the ceramic precursor oxides and calcining, crushing and pulverizing as described above, silver oxide may be added to this ceramic blend whereafter the silver doping is accomplished during the firing of the glass ceramic body. At the maximum firing temperature of 2000° F, the solidus of palladium-silver alloy occurs at about 75 weight percent silver. Large amounts of silver may be used of course when the firing temperature is lower, and smaller amounts of silver in the palladium-silver electrode tends to be more expensive. Thus an initial formulation for the alloy is preferred calling for 75 percent silver. However, after firing the alloy looses some silver to the ceramic and the cofired electrode that began as 75% silver may become an alloy of as little as 10 to 15% silver. A nearly 100% silver electrode for firing at lower temperatures would be expected to loose on the order of 25% silver.

In additional experiments, employing monolithic capacitors made as described for example X9 except having 0.001 inch thick active dielectric layers, four groups of capacitors were each fired to maturity on an open slab at different temperatures and the amount of silver dopant in the fired dielectric was measured in weight percent of silver as determined by a standard electron microprobe analysis. These results are given in Table V.

Table V

| Firing Temperature | Silver (Wt.%) | K | D.F. % | T.C.C. (% Δ C ref. 25° C) | | | |
|---|---|---|---|---|---|---|---|
| | | | | −55° C | +65° C | +85° C | +125° C |
| 1750° F | 0.59 | 965 | 0.66 | −19 | +4 | +4 | −2 |
| 1800° F | 0.62 | 1000 | 0.59 | −17 | +4 | +3 | −3 |
| 1850° F | 0.70 | 982 | 0.53 | −13 | +4 | +3 | −3 |
| 1900° F | 0.80 | 905 | 0.47 | −12 | +3 | +3 | −2.5 |

It is postulated that the silver dopant may advantageously be as high as about 1.0 weight percent of the dielectric material at firing temperatures approaching 2000° F. From the data of Table V it is seen that as the silver doping level increases, the stability of capacitance at the low temperature improves, and the dissipation factor decreases. However, the dielectric constant tends to decrease at the same time. Thus as little as 0.1 weight percent silver dopant in the ceramic may provide a suitable dielectric body where only moderate improvement is needed in the TCC and a high K is of primary importance.

It is concluded that the initial effect of including and increasing the lanthanum content in the ceramic is to reduce the Curie temperature of the material and thus increase the dielectric constant, and at least about 0.07 molar parts substitution of lanthanum for the lead is required in the dielectric materials of this invention. However, increases in lanthanum beyond about 0.16 molar parts reduces the peak dielectric constant at the Curie temperature beyond that which is useful in maintaining a high dielectric constant over the above noted temperature range of interest. Also, lanthanum is a refractory material so that larger quantities tend to raise the firing temperature at which densification may be achieved.

The substitution of titanate for some of the zirconate in the lead zirconate has a pronounced tendency to increase the dielectric constant and it is judged that a minimum of about 0.10 molar parts of titanate is required to achieve a dielectric constant of at least 300 in the glass-ceramic material of this invention. This trend becomes even more evident by a consideration of conventional mixing rules and from the dielectric constant data for a variety of pure lead-lanthanum zirconate-titanate compositions that is presented in the paper, "Hot Pressed (Pb,La) (Zr,Ti)$O_3$ Ferroelectric Ceramics for Electro-optic Applications" by G. H. Haertling and C. E. Land, Journal of the American Ceramics Society, Vol. 54, No. 1, January 1971, pages 1–11.

When more than about 0.40 molar parts titanium is included, the resulting material will cease to exhibit a sufficiently antiferroelectric behavior to provide the desired low VCC capacitor characteristics of this invention. It is also evident that less lead rich formulations than those described herein will be suitable for use in the unique lead retaining capacitors of this invention; for example, the lead enriching term x/4 used in the above mentioned ceramic formula may go toward and even to zero. It is also noted that glass-ceramic materials similar to this system except including larger amounts of titanate, although outside the scope of this invention, will probably retain their high insulation resistance and may exhibit higher dielectric constants as well as having other useful properties.

What is claimed is:

1. A ceramic capacitor comprising a glass ceramic dielectric body and two spaced electrodes in contact with said dielectric body, said body consisting essentially of a major proportion of a calcined high temperature ceramic and a minor proportion of a low temperature glass, said high temperature ceramic consisting essentially of a lead zirconate wherein from 0.07 to 0.16 molar parts of said lead are replaced with lanthanum and wherein from 0.10 to 0.40 molar parts of said zirconate are replaced by titanate, said high temperature ceramic being doped with from 0.1 to 1.0 weight percent silver.

2. The ceramic capacitor of claim 1 wherein said body contains no less than 4.5 weight percent of said low temperature glass.

3. The ceramic capacitor of claim 1 wherein said low temperature glass contains lead oxide in an amount not less than 20 weight percent.

4. The ceramic capacitor of claim 1 wherein said glass consists essentially by weight of from 8 to 30% of the glass formers selected from $B_2O_3$, $SiO_2$, and $GeO_2$; from 0 to 3% $Al_2O_3$; from 0 to 11% ZnO; from 0 to 50% CdO; from 0 to 90% $Bi_2O_3$ and from 0 to 85% PbO.

5. The ceramic capacitor of claim 1 wherein said glass has a melting temperature of less than 1600° F.

6. The ceramic capacitor of claim 1 wherein at least one final of said spaced electrodes is buried within said dielectric body and is composed of a silver containing alloy and some of said silver from said alloy having diffused into said high temperature ceramic provides said silver dopant therein.

7. The ceramic capacitor of claim 6 wherein said final electrode silver alloy is of reduced silver content from that of the initial alloy.

8. A monolithic ceramic capacitor comprising a glass ceramic dielectric body and at lest two spaced electrodes at least one of which is buried within said dielectric body, said body consisting essentially of a major proportion of a calcined high temperature ceramic and a minor proportion of a low temperature glass, said high temperature ceramic being formulated substantially according to

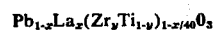

wherein $x$ is from 0.07 to 0.16 and $y$ is from 0.60 to 0.90, said high temperature ceramic being doped with from 0.1 to 1.0 weight percent silver.

9. The ceramic capacitor of claim 8 wherein $x$ is 0.14 and $y$ is 0.75.

10. The ceramic capacitor of claim 8 wherein $x$ is 0.112 and $y$ is 0.75.

11. The ceramic capacitor of claim 8 wherein said at least one buried electrode is of a silver containing alloy.

12. The ceramic capacitor of claim 11 wherein said alloy is a silver-palladium alloy, said silver being from 10 to 75 weight percent of said alloy.

13. A method for producing a ceramic capacitor comprising mixing a major proportion of a pulverized prefired lead zirconate ceramic and a minor proportion of a finely ground low temperature glass, in an organic binder medium wherein from 0.07 to 0.16 molar parts of said lead is replaced with lanthanum and wherein from 0.10 to 0.40 molar parts of said zirconate is replaced by titanate, forming a body of said glass ceramic mixture, forming two spaced electrodes in contact with said glass ceramic body, doping said ceramic with from 0.1 to 1.0 weight percent silver, and firing said body to maturity at a temperature no greater than 2000° F.

14. The method of claim 13 wherein said firing is accomplished in air.

15. The method of claim 13 wherein said minor proportion of said glass is no less than 4.5% by weight of said glass ceramic mixture.

16. The method of claim 13 wherein said minor proportion of said glass is from 6% to 7.8% by weight of said glass ceramic mixture.

17. The method of claim 13 wherein said low temperature glass contains no less than 20% lead oxide by weight.

18. A method for producing a silver doped ceramic capacitor comprising:
a. blending ceramic precursor compounds selected from oxides and carbonates of lead, lanthanum, zirconium and titanium in molar proportions substantially corresponding to the formula

wherein $x$ is from 0.07 to 0.16 and $y$ is from 0.60 to 0.90;
b. calcining by prefiring and then crushing and pulverizing said ceramic blend;
c. mixing a major proportion of said pulverized ceramic and a minor proportion of a finely ground low temperature glass in an organic binder medium;
d. forming a body of said glass ceramic mixture;
e. forming at least two spaced silver containing electrodes in contact with said glass ceramic body; and
f. firing said body to maturity at a temperature no greater than 2000° F, whereby said ceramic is doped with from 0.1 to 1.0 weight percent silver.

19. The method of claim 18 wherein said firing is accomplished in air.

20. The method of claim 18 additionally comprising burying at least one of said at least two electrodes within said body to make a monolithic ceramic type capacitor.

21. The method of claim 18 wherein said silver doping is accomplished during said firing, said blending of said prefired ceramic additionally including the addition of no less than 0.5 weight percent silver oxide in said ceramic blend.

22. The method of claim 20 wherein said forming and said burying of said electrodes is accomplished prior to said firing and said silver doping is at least partially accomplished at said firing by some of said silver from said electrodes diffusing into and reacting with said ceramic.

23. The method of claim 22 wherein said buried electrode is a palladium silver alloy, said electrode initially being about 75 weight percent silver.

24. The method of claim 18 wherein $x$ is 0.14 and $y$ is 0.75.

25. The method of claim 18 wherein $x$ is 0.112 and $y$ is 0.75.

26. A method for producing a silver doped ceramic capacitor comprising:
a. blending ceramic precursor compounds selected from oxides and carbonates of lead, lanthanum, zirconium and titanium in molar proportions substantially corresponding to the formula

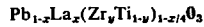

wherein $x$ is from 0.07 to 0.16 and $y$ is from 0.60 to 0.90, and including at least 0.5 weight percent silver oxide in said blend;

b. calcining by prefiring and then crushing and pulverizing said ceramic blend to produce a silver doped ceramic material;

c. mixing a major proportion of said prefired pulverized ceramic material and a minor proportion of a finely ground low temperature glass in an organic binder medium;

d. forming a body of said glass ceramic mixture;

e. forming at least two spaced electrodes in contact with said glass ceramic body; and f. firing said body to maturity at a temperature no greater than 2000° F.

* * * * *

UNITED STATES PATENT OFFICE
CERTIFICATE OF CORRECTION

Patent No. 4,027,209    Dated May 31, 1977

Inventor(s) Galeb H. Maher

It is certified that error appears in the above-identified patent and that said Letters Patent are hereby corrected as shown below:

Column 1, line 17, "2200°" should read -- 2200°F --

Column 3, line 42, "1200°" should read -- 1200°F --

Column 3, in Table I, "Pbo" should read -- PbO --

Column 3, line 65, the formula should read

-- $Pb_{1-x}La_x(Zr_yTi_{1-y})_{1-x/4}O_3$ --

Column 5, in Table III - Subheading Type Capacitor - for X15, "HN" should read -- HM --

Column 5, line 33, after "powder" insert -- mixture --

Column 5, line 35, "billing" should read -- milling --

Column 6, line 28, "-55°" should read -- -55°C --

Column 6, line 41, "+125°C" should read -- +25°C and +125°C --

Column 7, line 3, "and" should read -- sand --

Column 7, line 54, "to" (second occurrence) should read -- of --

Column 9, line 27, "power" should read -- powder --

Claim 8, line 2 (Column 11, line 39) "lest" should read -- least --

UNITED STATES PATENT OFFICE
CERTIFICATE OF CORRECTION

Patent No. 4,027,209          Dated May 31, 1977

Inventor(s) Galeb H. Maher

It is certified that error appears in the above-identified patent and that said Letters Patent are hereby corrected as shown below:

Claim 18, line 7 (Column 12, line 23) the formula should read

-- $Pb_{1-x}La_x(Zr_yTi_{1-y})_{1-x/4}O_3$ --.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*